(No Model.)

E. WENIGMANN.
CONDUIT FOR STREET PIPES.

No. 285,328. Patented Sept. 18, 1883.

WITNESSES:
Robt. H. Roy
Hermann Koster

INVENTOR
Ernest Wenigmann
BY
Frank S. Miller
ATTORNEY

UNITED STATES PATENT OFFICE.

ERNEST WENIGMANN, OF NEW YORK, N. Y.

CONDUIT FOR STREET-PIPES.

SPECIFICATION forming part of Letters Patent No. 285,328, dated September 18, 1883.

Application filed July 21, 1883. (No model.)

*To all whom it may concern:*

Be it known that I, ERNEST WENIGMANN, of the city of New York, county and State of New York, have invented a new and Improved Conduit for Street-Pipes, of which the following specification is a full, clear, and exact description.

This invention relates to a conduit for receiving mains and pipes in the streets of a city. This conduit will permit ready access to said pipes, and will at the same time present no obstacle to the traffic on the streets.

The invention consists, principally, in the combination of a conduit having side walls, and caps for protecting the tops of said walls, with cross-pieces and covers, all as hereinafter more fully described.

The invention also consists in the details of construction hereinafter set out.

Figure 1:
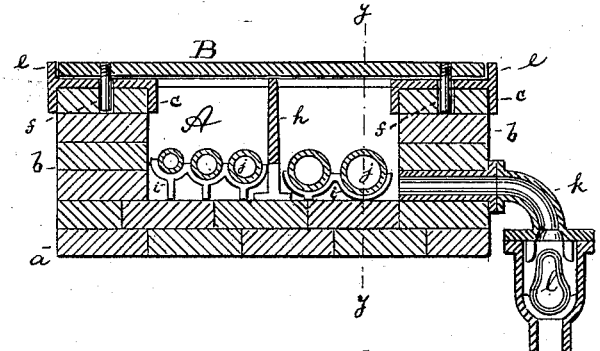
Figure 2:
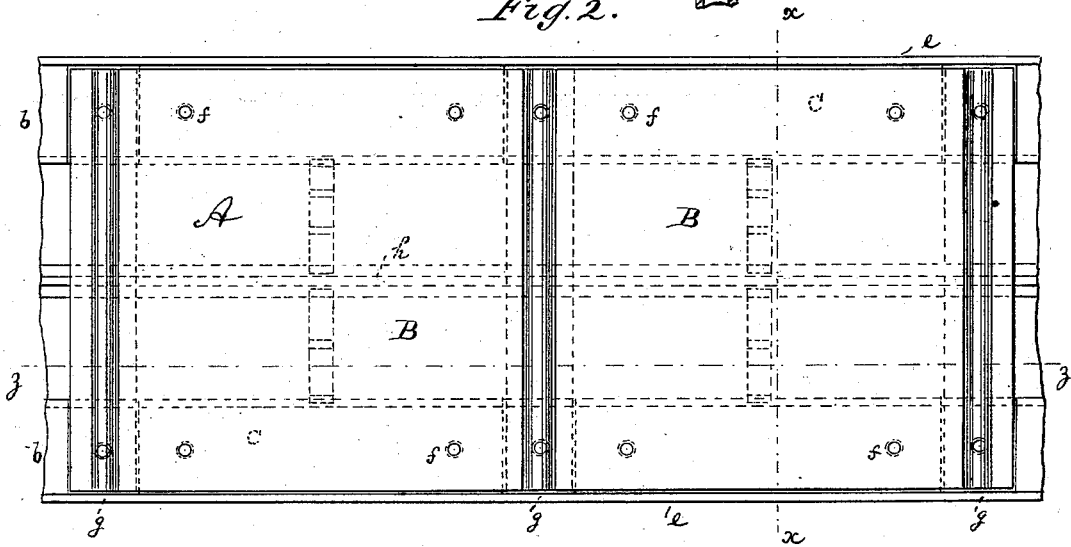
Figure 3:
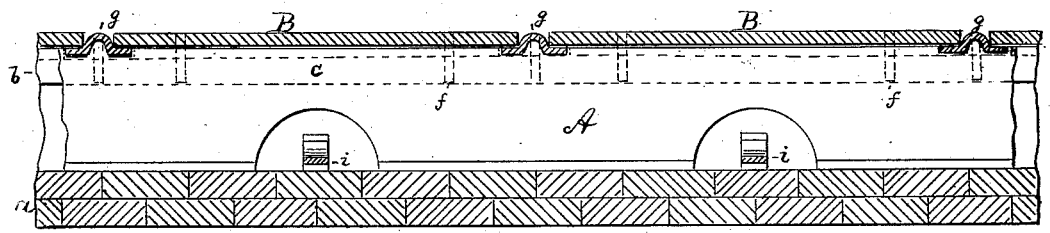

In the accompanying drawings, Figure 1 is a vertical transverse section of my improved conduit on the line $x\ x$, Fig. 2. Fig. 2 is a top view of the same; and Fig. 3 a vertical longitudinal section of the same on the lines $y\ y$, Fig. 1, and $z\ z$, Fig. 2.

Similar letters of reference indicate corresponding parts in all the figures.

The letter A represents my improved conduit, which I produce by digging a trench or ditch along a street, preferably directly at the curbstone. This trench I provide with a proper foundation, $a$, of brick or other material, and two brick walls or sides, $b\ b$. The surface of each wall $b$ is capped by a U-shaped metallic plate, $c$, having on its outer edge an upwardly-projecting flange, $e$. Upon the caps $c$ and between the flanges $e$ rest the covering-plates B of the conduit A. These covering-plates are provided with downwardly-projecting pins $f$, which enter perforations in the walls $b$.

$g\ g$ are cross-pieces stretched across the walls $b\ b$ at certain regular intervals, and serving to support the ends of the covers B. These cross-pieces are U-shaped in cross-section, Fig. 3, and are flanged at each side to support the ends of two adjacent covers, B. By having the cross-pieces $g$ U-shaped the upper surface of the conduit will be practically even, and at the same time the covers B may be readily raised at their edges if access to the conduit is desired.

$h$ is a support extending longitudinally through the conduit A and dividing it into two longitudinal compartments. It is perforated near its bottom, Fig. 1, to permit the rain-water to flow from one section into the other. At each side of support $h$ are the seats $i$ for the pipes $j$, which the conduit is to carry.

In order to provide a discharge for the rain-water that may enter the conduit, I connect the latter with the sewers at suitable intervals by pipe $k$. In this pipe I place a floating check-valve, $l$, which permits proper drainage of conduit A, while it will close the passage $k$, whenever the water in the sewer rises beyond the valve-seat, by lifting and holding the valve against its seat.

I claim as my invention—

1. The combination of a conduit, A, having walls $b\ b$, with the caps $c$, cross-pieces $g$, and covers B, substantially as specified.

2. The combination of conduit A, having walls $b\ b$, with the caps $c$, having flanges $e$ at their outer edges, and with the covers B, substantially as specified.

3. The combination of conduit A, having walls $b$, with the caps $c$, cross-pieces $g$, and with the covers B, having pins $f$, that enter perforations in walls $b$, substantially as herein shown and described.

4. The combination of conduit A, having walls $b$, with flanged caps $c$, and with U-shaped double-flanged cross-pieces $g$, and with the covers B, substantially as specified.

5. The combination of conduit A, having walls $b$, with caps $c$ and cross-pieces $g$, and with perforated longitudinal support $h$ and pipe-seats $i$, substantially as specified.

6. The combination of conduit A, having walls $b$, with caps $c$, cross-pieces $g$, covers B, and with the pipe $k$ and floating check-valve $l$, substantially as specified.

ERNEST WENIGMANN.

Witnesses:
F. V. BRIESEN,
ROBT. H. ROY.